Patented Nov. 23, 1948

2,454,645

UNITED STATES PATENT OFFICE 2,454,645

PRODUCTION OF ALKYL CHLORIDES

Eugen Gottfried Galitzenstein and Cyril Woolf, London, England, assignors to The Distillers Company, Limited, Edinburgh, Scotland, a British company No Drawing. Application April 24, 1945, Serial No. 590,127. In Great Britain April 12, 1944

Section 1, Public Law 690, August 8, 1946
Patent expires April 12, 1964

3 Claims. (Cl. 260—652)

This invention is for improvements in or relating to the production of alkyl chlorides.

In our copending United States application Serial No. 525,758 (now Patent No. 2,398,179, granted April 9, 1946) there is described a process for the manufacture of ethyl chloride which comprises reacting gaseous hydrogen chloride with a preformed sulphuric ester of ethyl alcohol in the presence of a compound of antimony, tin or bismuth at a temperature between 40° C. and 110° C.; a continuous process for the manufacture of ethyl chloride from ethylene is also described therein which comprises alternate stages of ethylene feed into sulphuric acid containing a compound of antimony, tin or bismuth and gaseous hydrogen chloride feed into the sulphuric esters of ethyl alcohol thereby produced. The process is carried out in a substantially anhydrous medium.

An object of the present invention is to provide an improved process for the manufacture of acyclic aliphatic alkyl chlorides having three or more carbon atoms in the molecule.

According to the present invention there is provided a process which comprises reacting gaseous hydrogen chloride with sulphuric acid esters of an acyclic aliphatic alcohol having three or more carbon atoms in the molecule in the presence of water in an amount not less than five per cent by weight of said sulphuric acid esters. No metallic catalysts are necessary in the process of the present invention whereas, in the process for the manufacture of ethyl chloride according to our aforesaid application No. 525,758, the stated catalysts were essential to the success of the process. Free sulphuric acid has been found to accelerate the reaction and according to a feature of the invention therefore the sulphuric esters contain less than a molar proportion of the aliphatic alcohol to each molar proportion of sulphuric acid.

The reaction is preferably effected at temperatures between room temperature and 60° C.

The following examples illustrate the manner in which the invention may be carried into effect.

Example 1.—A solution containing the sulphuric acid esters of secondary-butyl alcohol $CH_3.CH_2.CHOH.CH_3$ was prepared by dropping 74 gms. of secondary-butyl alcohol (1 mol) into 173 gms. aqueous sulphuric acid of 87.2% concentration by weight (equivalent to 1.57 mols of acid of 100% concentration by weight) which were stirred and cooled. Secondary-butyl hydrogen sulphate was formed together with some di-secondary-butyl sulphate. The proportion of water in the solution was 16.3% by weight. Gaseous hydrogen chloride was introduced into this solution of the sulphuric acid esters of secondary butyl alcohol while stirring and maintaining a temperature of 30° C. Hydrogen chloride was absorbed and secondary-butyl chloride, $CH_3.CH_2.CHCl.CH_3$, was formed. After the absorption of hydrogen chloride had ceased, the upper layer containing the secondary butyl chloride was separated from the aqueous sulphuric acid. On rectification pure secondary-butyl chloride, B. P. 68° C., was obtained in a yield of 93% by weight based on the secondary-butyl alcohol used.

Example 2.—A solution of sulphuric acid esters of isopropyl alcohol was prepared by dissolving 50 gms. of propylene gas (1.19 mols) in 174 gms. aqueous sulphuric acid of 85% concentration by weight (equivalent to 1.51 mols of acid of 100% concentration by weight) at a temperature of 30° C. Into this solution, which contained 11.7% by weight water, gaseous hydrogen chloride was passed, while maintaining a temperature of 50° C. in the liquid. The exit gases, consisting of isopropyl chloride vapours together with some excess of hydrogen chloride, were led into ice water, and liquid isopropyl chloride separated on top of the dilute hydrogen chloride solution thus formed. Upon rectification, pure isopropyl chloride, B. P. 35° C., was obtained in a yield of 91% by weight based on propylene used.

We have found, furthermore, that the spent liquids resulting from the reaction between hydrogen chloride and the sulphuric esters of acyclic aliphatic alcohols having three or more carbon atoms in the molecule have the power of absorbing acyclic aliphatic olefines containing three or more carbon atoms in the molecule, thus reforming the original sulphuric acid esters. The reformed sulphuric esters are capable of reacting again with hydrogen chloride to produce the corresponding alkyl chlorides thus making it possible to carry out the process in a semi-continuous manner.

Accordingly, therefore, our invention includes a process for the manufacture of acyclic aliphatic alkyl chlorides containing three or more carbon atoms from the corresponding olefines comprising a number of cycles, each cycle comprising two stages, the first a stage of olefine feed and the second a stage of hydrogen chloride feed. In the first stage of the first cycle an acyclic aliphatic olefine containing at least three carbon atoms in the molecule is absorbed by aqueous sulphuric acid containing more than 8% by weight of water, and preferably between 10 and 20% by weight, in order to produce a mixture of sulphuric esters of the corresponding alcohol and free sulphuric acid, this mixture containing more than 5% by weight of water. In the second stage of the first cycle the mixture is reacted with gaseous hydrogen chloride to produce the alkyl chloride which is separated from the aqueous sulphuric acid as described in Example 1 or Example 2. In the first stage of the second cycle the olefine is passed into the recovered sulphuric acid following which the hydrogen chloride is reacted with the solution containing the reformed sulphuric esters. Further cycles are the same as the second cycle.

*Example 3.*—The spent sulphuric acid left from Example 2 was allowed to absorb 49 gms. of propylene at 30° C. and the solution of sulphuric esters of isopropyl alcohol was reacted with gaseous hydrogen chloride at 50° C. producing isopropyl chloride in the exist gases. The yield in the second cycle was 92% by weight of the theoretical. Further cycles were carried out in a similar way.

*Example 4.*—56 gms. of n-butylene, consisting mainly of 2-butene in admixture with little 1-butene, were absorbed by 191 gms. of aqueous sulphuric acid of 79% concentration by weight while stirring and maintaining, by cooling, a temperature of 25° C. in the liquid. The solution of sulphuric esters of secondary-butyl alcohol obtained was reacted with gaseous hydrogen chloride at 30° C. until the absorption of hydrogen chloride had practically ceased. From the liquid reaction mixture the secondary-butyl chloride produced was separated as the top layer at room temperature. The bottom layer of recovered sulphuric acid was used for the second cycle and further cycles were carried out similarly.

Other acyclic aliphatic alkyl chlorides, for instance, amyl chloride, can be obtained from the corresponding olefines by a similar procedure.

We are aware it has already been proposed in U. S. Patent No. 2,284,467 to produce alkyl chlorides by contacting an olefine and substantially anhydrous hydrogen chloride with sulphuric acid of a concentration of between 97% and 100% by weight. In the presence of concentrated sulphuric acid, however, acyclic aliphatic olefines containing three or more carbon atoms in the molecule are liable to undergo side-reactions leading to resinification, polymerisation and the formation of sulphur dioxide with a resulting lowering of the efficiency of the reaction; in the process of our invention this disadvantage is, however, obviated by the use of water in the reaction mixture in an amount not less than 5% by weight of the sulphuric esters, i. e., by the use of sulphuric acid of a concentration not greater than 92%.

What we claim is:

1. A process for the manufacture of alkyl chlorides comprising a number of cycles each consisting of a first stage of passing an acylic aliphatic olefine containing not less than three carbon atoms into sulphuric acid containing not less than 8% by weight and not more than 20% by weight of water to produce a reaction mixture containing the corresponding alkyl sulphuric esters and free sulphuric acid and a second stage consisting of passing gaseous hydrogen chloride into said reaction mixture at a temperature between room temperature and 60° C., separating the resultant alkyl chloride-containing upper layer and recovering the alkyl chloride therefrom, and returning the sulphuric acid to the first stage of the succeeding cycle.

2. A process for the manufacture of alkyl chlorides comprising a number of cycles each consisting of a first stage of passing an acyclic aliphatic olefine containing not less than three carbon atoms into sulphuric acid containing between 10% and 20% by weight of water to produce a reaction mixture containing the corresponding alkyl sulphuric esters and free sulphuric acid and a second stage consisting of passing gaseous hydrogen chloride into said reaction mixture at a temperature between room temperature and 60° C., separating the resultant alkyl chloride-containing upper layer and recovering the alkyl chloride therefrom, and returning the sulphuric acid to the first stage of the succeeding cycle.

3. A process for the manufacture of alkyl chlorides comprising a number of cycles each consisting of first stage of passing an acyclic aliphatic olefine containing not less than three carbon atoms into sulphuric acid containing between 10% and 20% by weight of water whilst cooling to produce a reaction mixture containing the corresponding alkyl sulphuric esters and free sulphuric acid and a second stage consisting of passing gaseous hydrogen chloride into said reaction mixture at a temperature between room temperature and 60° C., separating the resultant alkyl chloride-containing upper layer and recovering the alkyl chloride therefrom, and returning the sulphuric acid to the first stage of the succeeding cycle.

EUGEN GOTTFRIED GALITZENSTEIN.
CYRIL WOOLF.

REFERENCES CITED

The following references are of record in the file of this patent:

UNITED STATES PATENTS

| Number | Name | Date |
|---|---|---|
| 2,016,072 | Calcott et al. | Oct. 1, 1935 |
| 2,263,666 | Wilson | Nov. 25, 1941 |